(12) United States Patent
Ettorre et al.

(10) Patent No.: US 11,035,277 B2
(45) Date of Patent: Jun. 15, 2021

(54) EXHAUST GAS TREATMENT DEVICE FOR AN EXHAUST SYSTEM OF AN INTERNAL COMBUSTION ENGINE

(71) Applicant: MARELLI EUROPE S.p.A., Corbetta (IT)

(72) Inventors: Daniele Ettorre, Milan (IT); Massimiliano Gambarotto, Turin (IT); Emanuele Milani, Sandigliano (IT); Mauro Brignone, Turin (IT); Marco La Sana, Turin (IT); Domenico Spatafora, Turin (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/850,876

(22) Filed: Apr. 16, 2020

(65) Prior Publication Data
US 2020/0332694 A1    Oct. 22, 2020

(30) Foreign Application Priority Data
Apr. 18, 2019    (IT) .................. 102019000006064

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *B01D 2251/2067* (2013.01);
(Continued)

(58) Field of Classification Search
CPC ......... B01D 2251/2067; B01F 3/04049; B01F 5/0473; B01F 5/0606; B01F 5/0616;
(Continued)

(56) References Cited

U.S. PATENT DOCUMENTS 8,539,761 B2 *   9/2013   Lebas ................ B01F 3/04049
                                                              60/324
8,938,954 B2 *   1/2015   De Rudder ............ F01N 3/035
                                                              60/317
(Continued)

FOREIGN PATENT DOCUMENTS

WO        2018156146 A1      8/2018

OTHER PUBLICATIONS

Search Report for Italian Patent Application No. 201900006064 dated Nov. 18, 2019.
(Continued)

*Primary Examiner* — Jesse S Bogue
(74) *Attorney, Agent, or Firm* — Howard & Howard Attorneys PLLC (57) ABSTRACT

An exhaust gas treatment device for an exhaust system of an internal combustion engine; the treatment device is provided with: a tubular duct, which is delimited by a first tubular side wall and has a first exhaust gas inlet opening, a first exhaust gas outlet opening, and an injection opening; and a mixing body, which is arranged inside the tubular duct, is hollow on the inside so that the exhaust gases can flow through it, and has a first perforated base wall with a circular shape, which faces the first outlet opening, a second base wall with a partially circular shape, which faces the first inlet opening, and a second tubular side wall, which joins the first base wall to the second base wall and has a second inlet opening leading into the mixing body.

16 Claims, 8 Drawing Sheets

(52) U.S. Cl.
CPC ...... *F01N 2240/20* (2013.01); *F01N 2610/02* (2013.01); *F01N 2610/08* (2013.01); *F01N 2610/14* (2013.01)

(58) Field of Classification Search
CPC ............. F01N 2240/20; F01N 2610/02; F01N 2610/08; F01N 2610/14; F01N 3/2066; F01N 3/2892; F01N 3/2073
See application file for complete search history.

(56) References Cited

U.S. PATENT DOCUMENTS

| | | | |
|---|---|---|---|
| 9,346,017 | B2 | 5/2016 | Greber |
| 9,512,767 | B2* | 12/2016 | De Rudder ............... F01N 3/28 |
| 10,179,315 | B2* | 1/2019 | Brandl ............... B01F 3/04049 |
| 10,287,948 | B1* | 5/2019 | Moulieres .......... B01D 46/0027 |
| 10,443,477 | B2* | 10/2019 | Sampath ............... F01N 3/2066 |
| 10,473,018 | B2* | 11/2019 | Vankan ............... B01F 3/04049 |
| 10,704,448 | B2* | 7/2020 | Wang ...................... F01N 3/206 |
| 2014/0318112 | A1 | 10/2014 | Solbrig et al. |
| 2016/0131007 | A1* | 5/2016 | Kauderer ............ F01N 13/0097 422/177 |
| 2016/0317986 | A1 | 11/2016 | Alano |
| 2020/0217233 | A1* | 7/2020 | Wang .................... F01N 3/2892 |
| 2020/0269189 | A1* | 8/2020 | Alano ..................... F01N 3/206 |
| 2020/0347767 | A1* | 11/2020 | El-Gammal .......... B01F 5/0065 |

OTHER PUBLICATIONS

Communication dated Aug. 14, 2020 transmitting the Extended European Search Report dated Jun. 26, 2020 for European Application No. 20170091.

* cited by examiner

EXHAUST GAS TREATMENT DEVICE FOR AN EXHAUST SYSTEM OF AN INTERNAL COMBUSTION ENGINE

CROSS-REFERENCE TO RELATED APPLICATIONS

This Patent Application claims priority from Italian Patent Application No. 102019000006064 filed on Apr. 18, 2019, the entire disclosure of which is incorporated herein by reference.

TECHNICAL FIELD

The invention relates to an exhaust gas treatment device for an exhaust system of an internal combustion engine.

PRIOR ART

International directives establishing the progressive reduction of the emissions of polluting gases produced by cars set a very low limit for the quantity of $NO_x$ molecules that can be released into the atmosphere.

Compliance with these limits is very critical, especially for Diesel engines; for this reason, manufacturers have had the idea of providing the exhaust system of a Diesel engine with a further selective catalytic reduction (SCR) system for $NO_x$, which is used to convert $NO_x$ molecules ($NO_2$ or $NO$) into nitrogen ($N_2$), which is an inert gas, and water ($H_2O$). The reaction of reduction of $NO_x$ molecules into nitrogen ($N_2$) is difficult to be obtained without using an adequate reductant, typically ammonia ($NH_3$). The reductant must be injected into the exhaust system and upstream of the SCR catalytic converter, so as to be mixed with exhaust gases before entering the SCR catalytic converter.

However, storing ammonia in a car is unwise due to evident safety reasons concerning the fact that ammonia is toxic. As a consequence, manufactures suggested storing and injecting a water solution of urea, since urea, because of the heat of the exhaust gases and also partly due to a catalytic effect, decomposes into ammonia.

In order to maximize the efficiency of the SCR catalytic converter, the concentration of ammonia on the surface of the monolith of the SCR catalytic converter needs to be as homogeneous as possible. Furthermore, a problem linked to the injection of a water solution of urea into the exhaust system is due to the fact that on the inner walls of the exhaust system there can be hardly removable solid deposits both of urea and of isocyanic acid (NHCO), which is a possible derivative of the decomposition of urea.

In order to maximize the homogeneity of the concentration of ammonia on the surface of the monolith of the SCR catalytic converter (and also in order to avoid the formation of solid deposits on the inner walls of the exhaust system), manufacturers suggested inserting, in the exhaust system and close to the urea injection area, a mixer, which, by forming a turbulence in the exhaust gases, helps the ammonia in the exhaust gases be dispersed. Patent application WO2018001789A1 discloses an exhaust gas treatment device, which is provided with an injector for a reducing additive in the area of a static mixer (namely, without of moving parts).

U.S. Pat. No. 9,346,017B2 discloses an exhaust line of a motor vehicle comprising an upstream monolith and a downstream monolith for the treatment of the exhaust gases; between the two monoliths there are an injector for a water solution of urea and a mixing body, which forces the exhaust gases to follow a circular path.

However, known mixers of the type described above suffer from the drawback of not having an ideal balance between the opposing needs of effectiveness (namely, of ensuring a proper mixing of the exhaust gases) and of efficiency (namely, of limiting load losses in the exhaust gases). In other words, known mixers of the type described above wither have a low effectiveness (namely, do to ensure a proper mixing of the exhaust gases) or have a low efficiency (namely, cause high load losses in the exhaust gases).

DESCRIPTION OF THE INVENTION

The object of the invention is to provide an exhaust gas treatment device for an exhaust system of an internal combustion engine, said treatment device not suffering from the drawbacks described above and, in particular, being easy and economic to be manufactured.

According to the invention, there is provided an exhaust gas treatment device for an exhaust system of an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
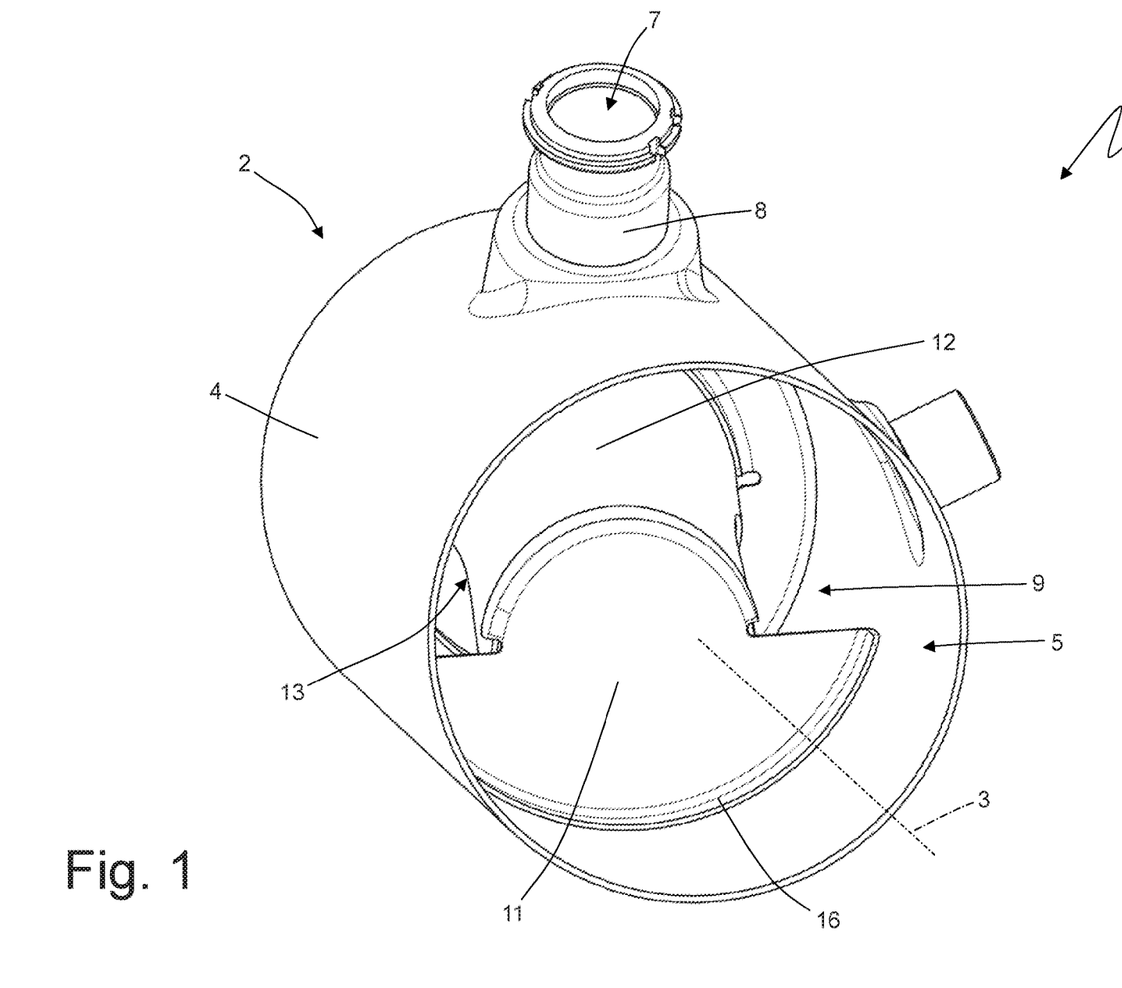
FIG. 1 is a perspective view of an exhaust gas treatment device according to the invention.
Figure 2:
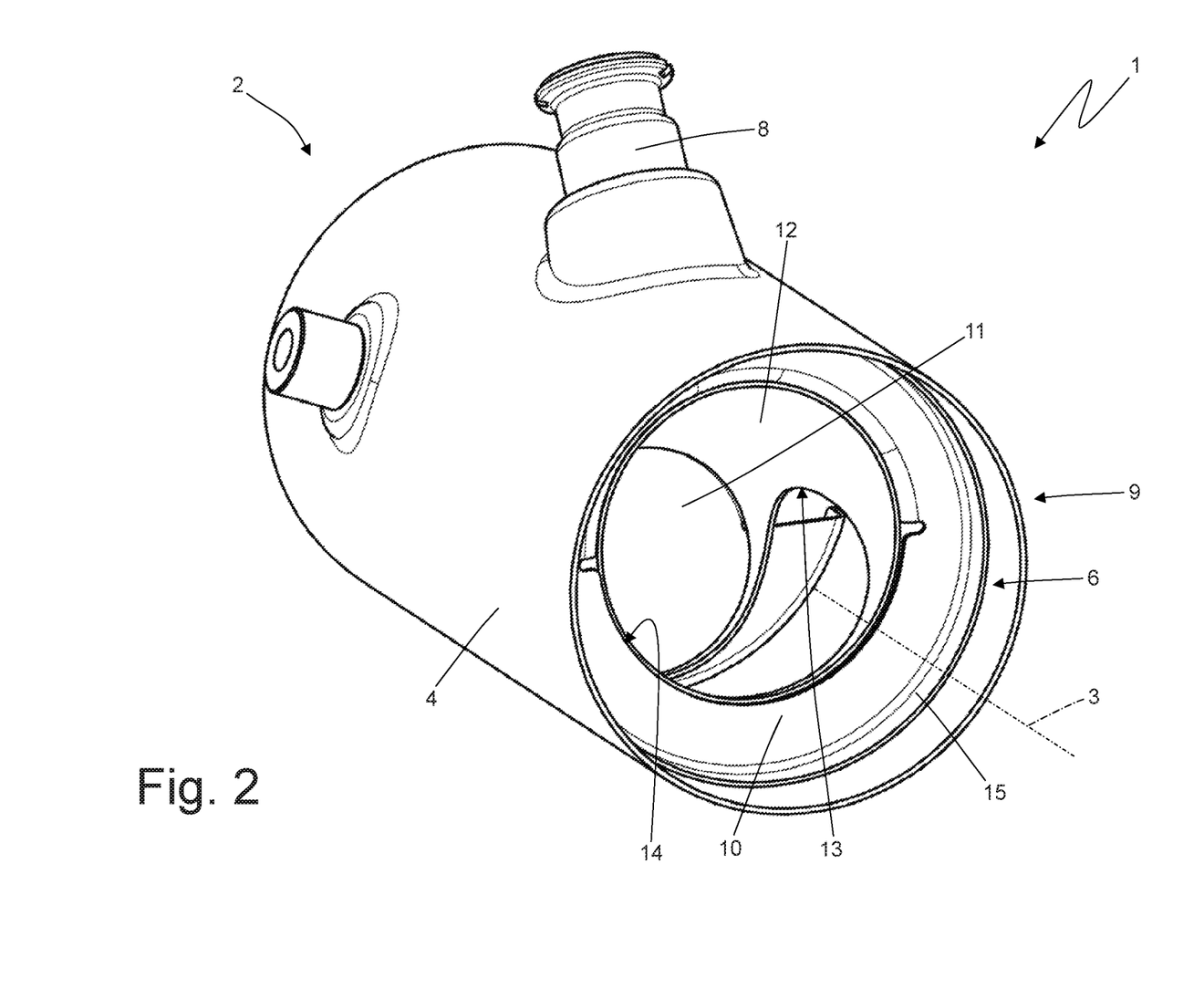
FIG. 2 is a further perspective view of the treatment device of FIG. 1.

In FIGS. 1 and 2, number 1 indicates, as a whole, an exhaust gas treatment device for an exhaust system of an internal combustion engine operating according to a "Diesel" cycle (i.e. powered by Diesel fuel or the like).

The exhaust gas treatment device 1 comprises a tubular duct 2, which has a central longitudinal axis 3 and has a cylindrical shape (namely, has a circular cross section with a constant diameter). The tubular duct 2 is delimited by a tubular side wall 4, which is made of sheet metal and has an exhaust gas inlet opening 5 (shown in FIG. 1), which is arranged in the area of a first base of the tubular duct 2, and an exhaust gas outlet opening 6 (shown in FIG. 2), which is opposite the inlet opening 5 and is arranged in the area of a second base of the tubular duct 2 (obviously, opposite the first base of the tubular duct 2); as a consequence, in use, the exhaust gases flow into the tubular duct 2 through the opening 5, flow through the tubular duct 2 and, then, flow out of the tubular duct 2 through the outlet opening 6.

The tubular duct 2 further has an injection opening 7, which is obtained through the tubular side wall 4 between the inlet opening 5 and the outlet opening 6 and is designed to receive a reducing substance injector; in particular, around the opening 7 there is a tubular housing 8, which projects from the tubular side wall 4 and is configured to receive the injector. The injector is designed to inject into the tubular duct 2 a reducing additive and, in particular, a water solution of urea (i.e. a solution of urea and water); in use, because of the heat of the exhaust gases present inside the tubular duct 2, the urea spontaneously decomposes into isocyanic acid (NHCO) and ammonia ($NH_3$), said ammonia acting as reductant inside a following SCR catalytic convert so as to facilitate the reaction of resolution of $NO_x$ molecules into nitrogen ($N_2$) and water ($H_2O$).

Figure 3:
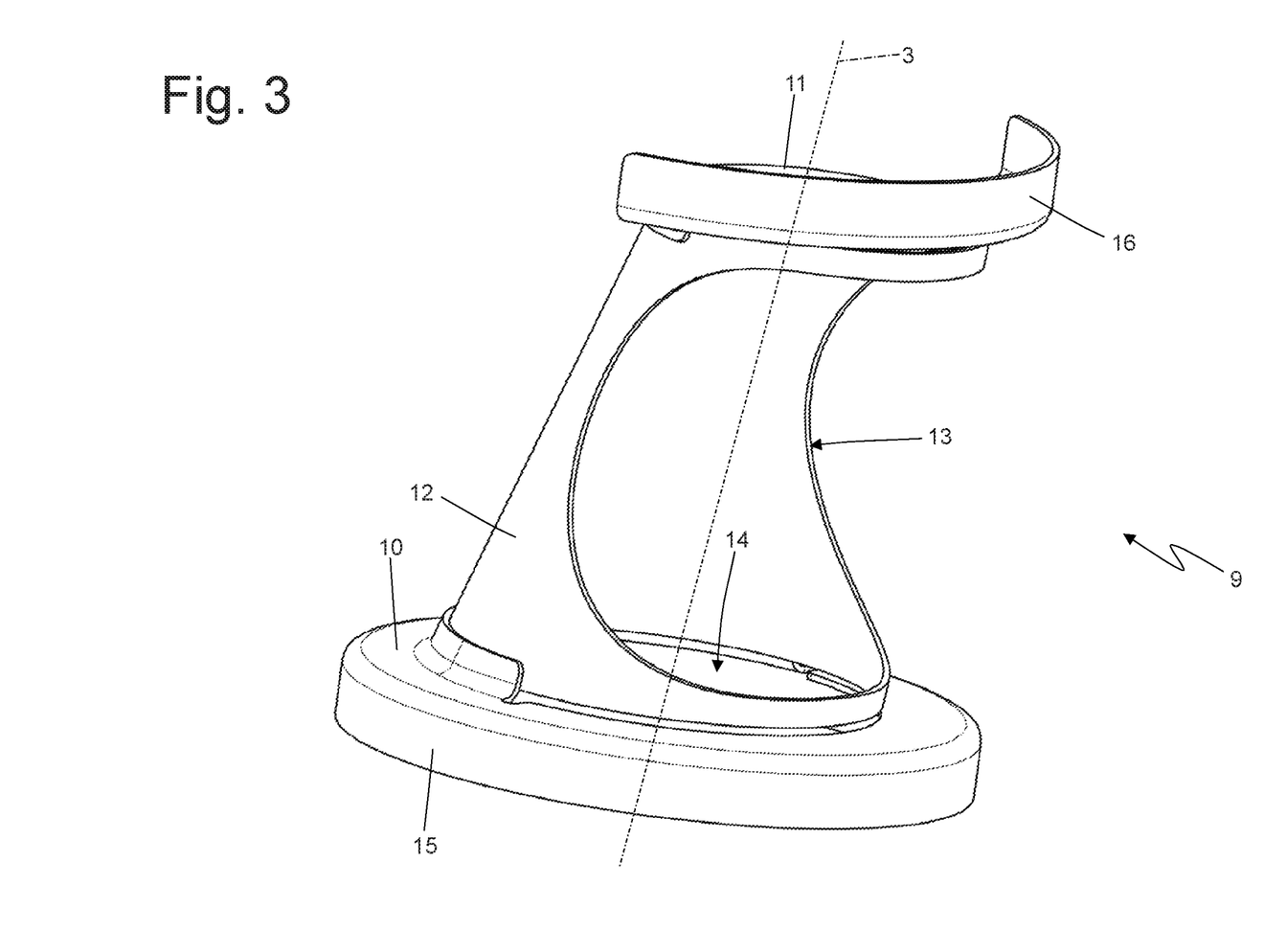
FIGS. 3 and 4 are two different perspective views of a mixing body of the treatment device of FIG. 1.
Figure 4:
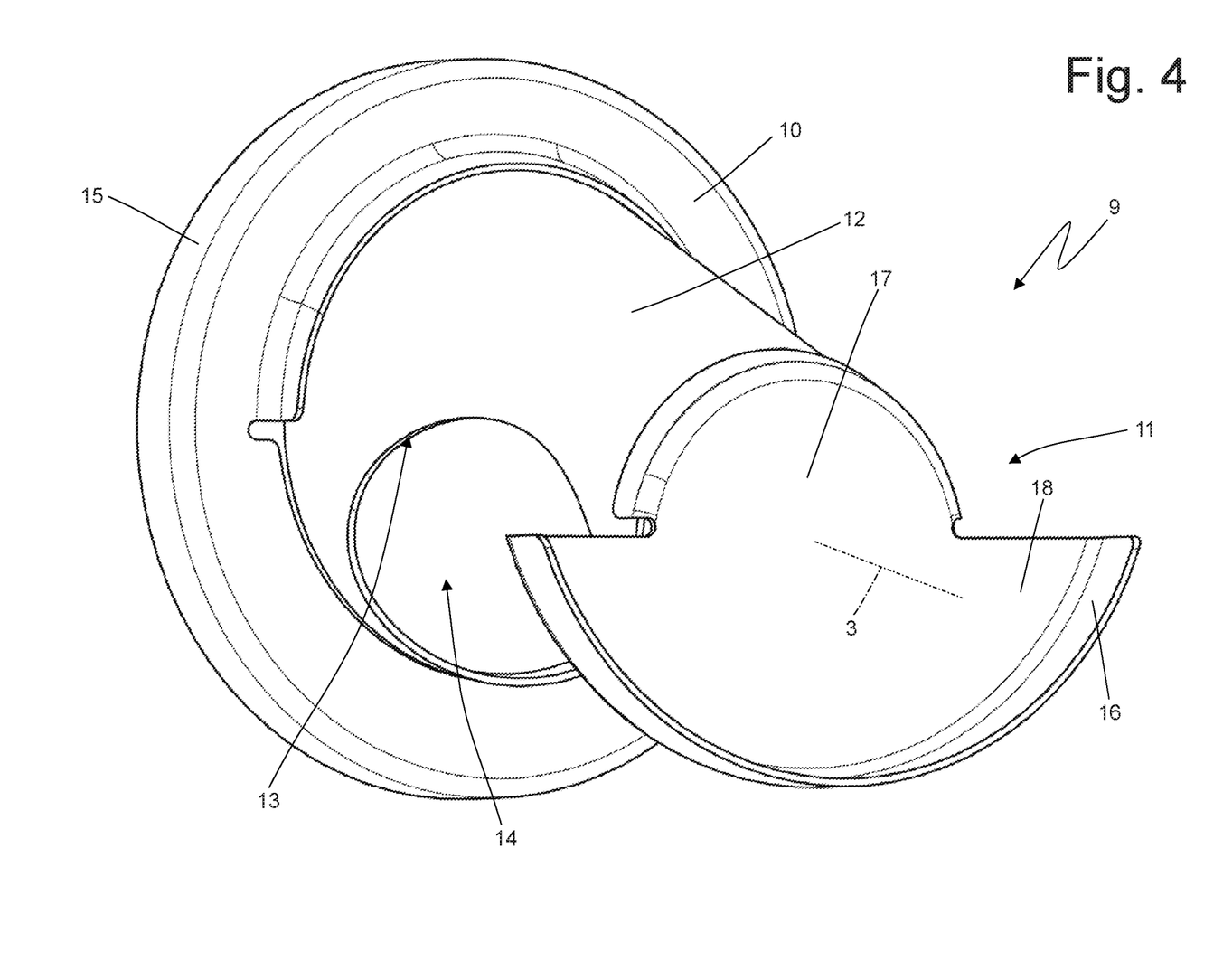
Figure 5:
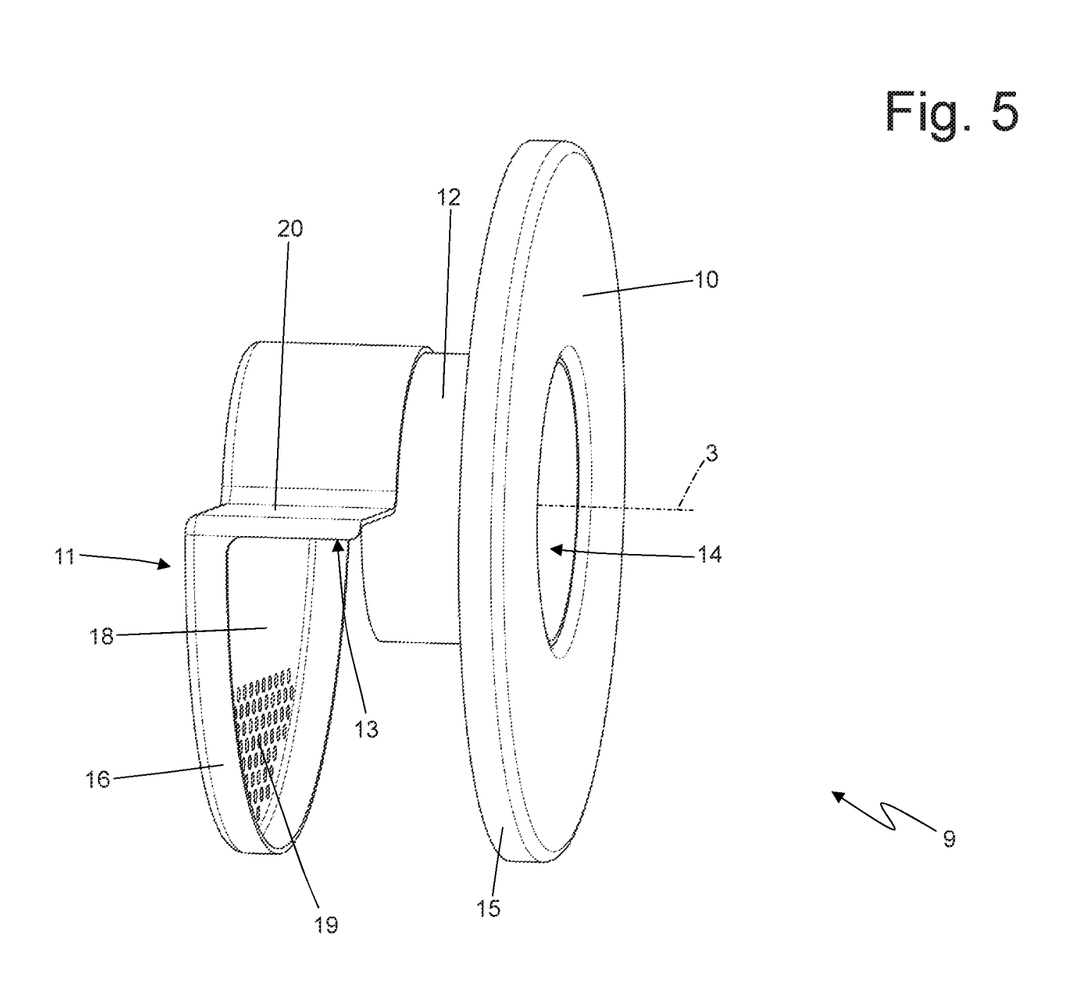
FIGS. 5-8 are four different perspective views of a variant of the mixing body of FIGS. 3 and 4.
Figure 6:
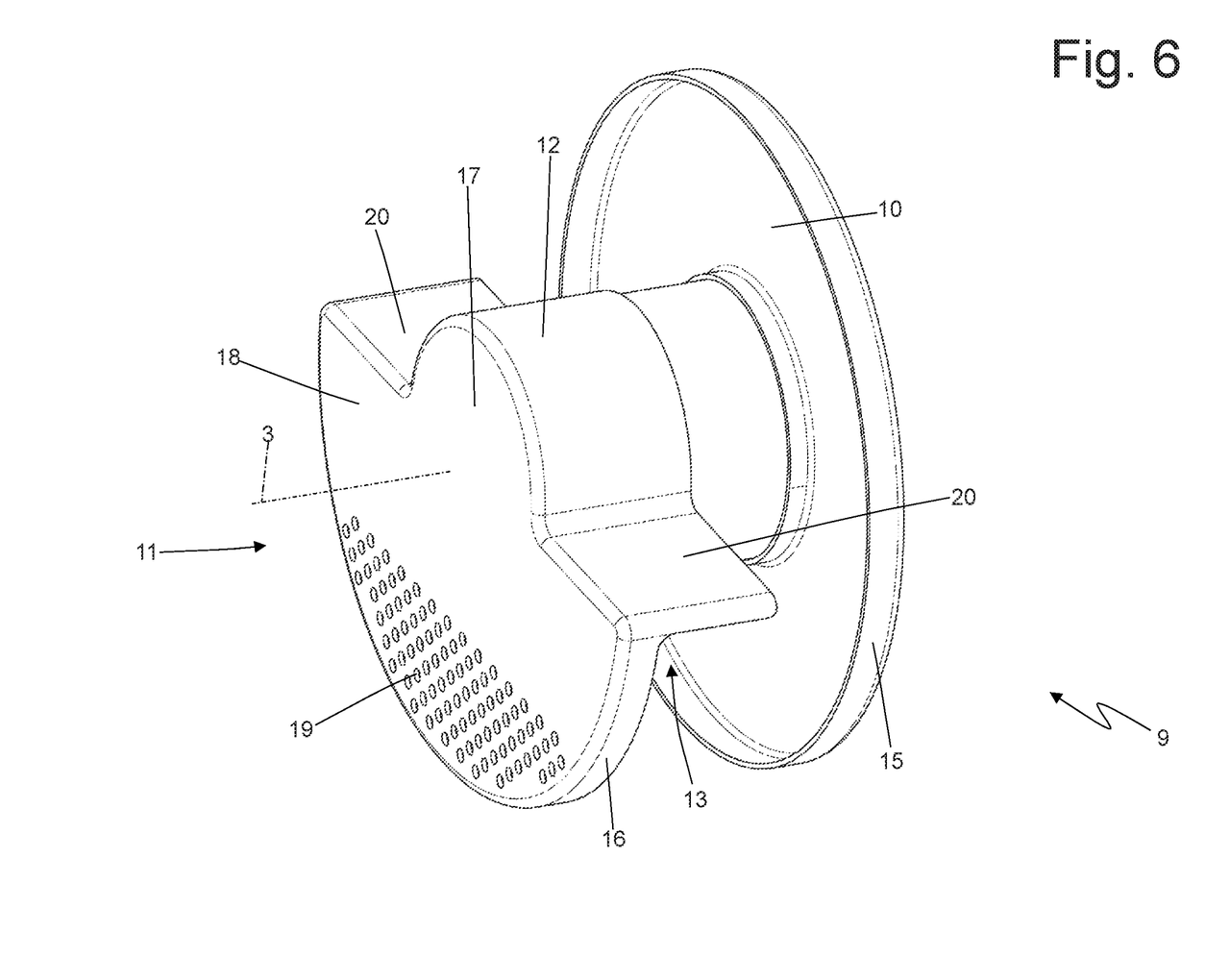
Figure 7:
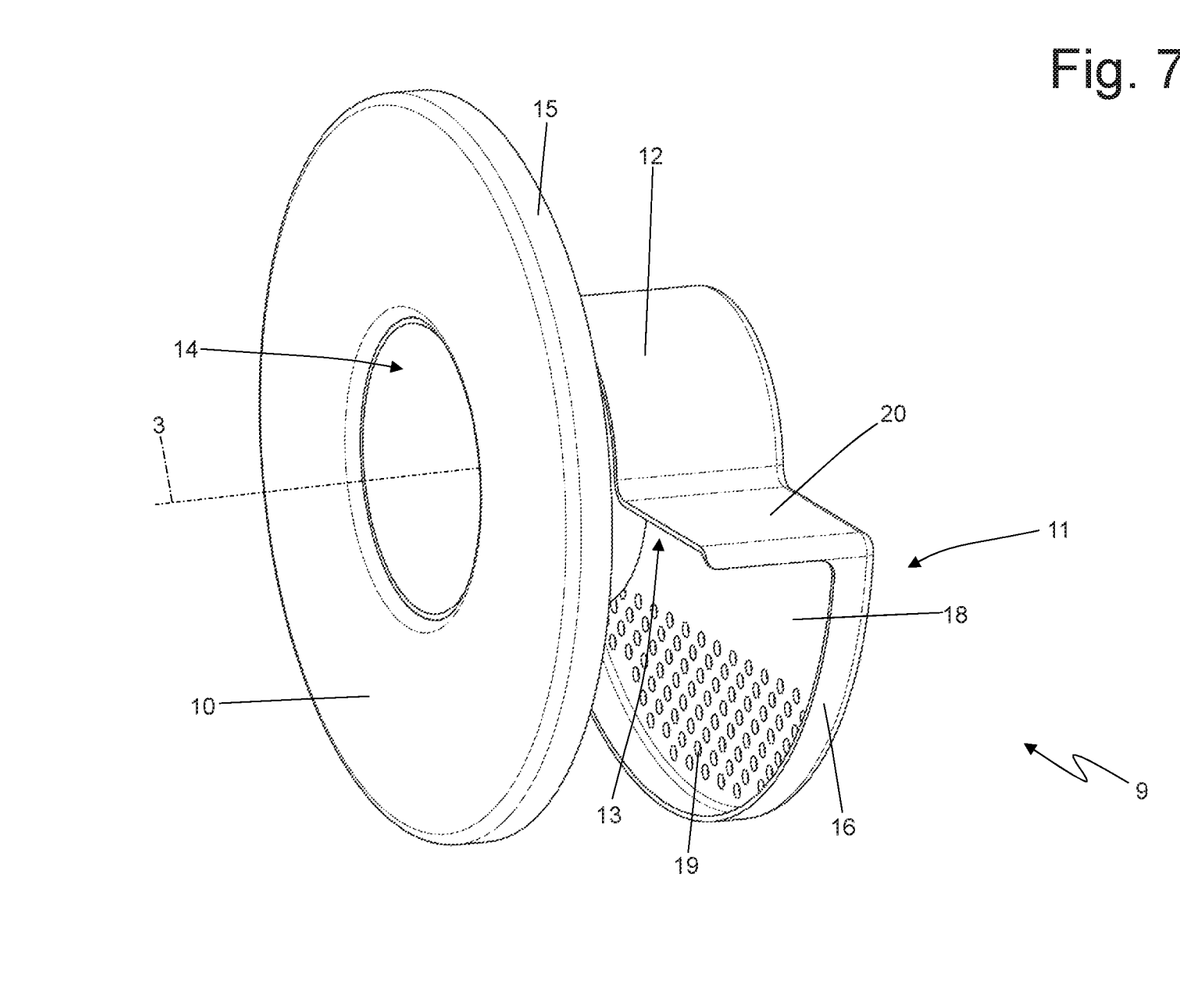
Figure 8:
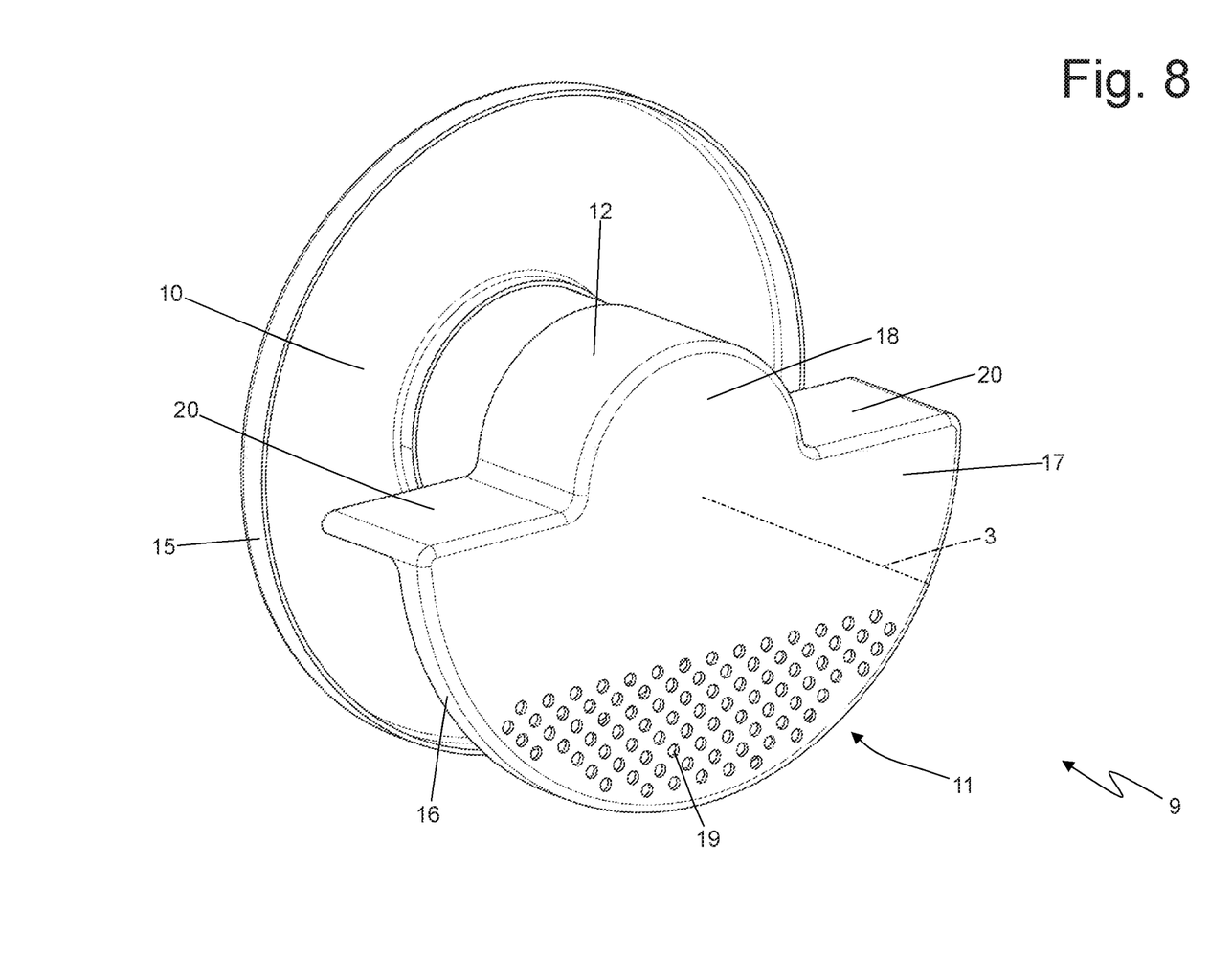

According to FIGS. 3 and 4, the treatment device 1 comprises a mixing body 9 (a static mixing body, namely without moving parts), which is arranged inside the tubular duct 2, creates a forced path to be followed by the exhaust gases in order to flow from the inlet opening 5 to the outlet opening 6, and is hollow on the inside so that the exhaust gases can flow through it. In particular, the mixing body 9 has the function of generating turbulences in the exhaust gases present inside the tubular duct 2 so as to increase the efficiency of the following SCR catalytic converter, thus making the dispersion of ammonia in the exhaust gases more homogeneous.

The mixing body 9 has a perforated base wall 10 with a circular shape, which faces the outlet opening 6 of the tubular duct 2 and completely engages (closes) the cross section of the tubular duct 2 (namely, the exhaust gases cannot flow past the base wall 10, except through the hole of the base wall 10 itself), a base wall 11 with a partially circular shape and without holes, which faces the inlet opening 5 of the tubular duct 2 and only partially engages (closes) the cross section of the tubular duct 2 (namely, the exhaust gases can flow past the base wall 11 by flowing beside the base wall 11 itself), and a tubular side wall 12, which joins the base wall 10 to the base wall 11 and has an inlet opening 13, which leads into the mixing body 9.

The base walls 10 and 11 of the mixing body 9 and the tubular side wall 12 of the mixing body 9 are coaxial to the tubular duct 2 and, therefore, share with the tubular duct 2 the same central longitudinal symmetry axis 3.

The base wall 10 of the mixing body 9 has one single outlet opening 14 with a circular shape, so that the exhaust gases flowing into the mixing body 9 through the inlet opening 13 can subsequently flow out of the mixing body 9 and quickly reach the outlet opening 6 of the tubular duct 2 flowing through the outlet opening 14. The exhaust gases flowing into the tubular duct 2 through the inlet opening 5 are necessarily forced to flow into the mixing body 9 through the inlet opening 13 and, then, to flow out of the mixing body 9 through the outlet opening 14 (since they can only flow out of the tubular body 2 by flowing through the inside of the mixing body 9). The inlet opening 13 of the mixing body 9 is arranged perpendicularly relative to the inlet opening 5 of the tubular body 2 and also relative to the outlet opening 14 of the mixing body 9 (and, hence, also relative to the outlet opening 6 of the tubular duct 2); this change in orientation between the inlet opening 5 of the tubular duct 2, the inlet opening 13 of the mixing body 9 and the outlet opening 14 of the mixing body 9 causes the exhaust gases to gain a (relevant) radial (circumferential) motion component, which is added to the main axial motion component.

Furthermore, the exhaust gases also gain a circumferential motion component, which is added to the main axial motion component, also thanks to the fact that the base wall 11 of the mixing body 9 partially engages (closes) the cross section of the tubular body 2 in the area of the inlet opening 13 of the mixing body 9; as a consequence, the exhaust gases flowing into the tubular body 2 through the inlet opening 5 cannot directly reach the inlet opening 13 of the mixing body 9 by simply moving in an axial manner, but, first, they have to move around the tubular side wall 12 of the mixing body 9 for approximately 180° in order to reach the area behind the inlet opening 13 (not engaged by the base wall 11 of the mixing body 9), which can be reached by the exhaust gases by axially moving from the inlet opening 5 of the tubular duct 2 to the inlet opening 13 of the mixing body 9.

According to a preferred embodiment shown in the accompanying figures, the inlet opening 13 of the tubular side wall 12 of the mixing body 9 is arranged on the opposite side of the injection opening 7, so that the injection opening 7 faces a portion of the tubular side wall 12 without holes; furthermore, as already mentioned above, in the portion of the tubular side wall 12 of the mixing body 9 opposite the inlet opening 13, the exhaust gases have a turbulent motion (due to the radial and tangential motion components generated by the particular conformation of the mixing body 9), which enhances an ideal mixing of the reducing agent injected through the injection opening 7 with the exhaust gases.

According to a referred embodiment shown in FIGS. 1-4, the tubular side wall 12 of the mixing body 9 has a conical shape, which is tapered from the base wall 10 to the base wall 11; namely, the tubular side wall 12 of the mixing body 9 has a maximum diameter in the area of the base wall 10 and has a minimum diameter in the area of the base wall 11. As a consequence, the tubular side wall 12 of the mixing body 9 has, as a whole, the shape of a truncated cone, which is tapered from the outlet opening 6 of the tubular duct 2 to the inlet opening 5 of the tubular duct 2.

The conical shape of the tubular side wall 12 of the mixing body 9 determines a continuous change in the area of the cross section flown through by the exhaust gases flowing towards the outlet opening 6 of the tubular duct 2 and this continuous change determines an increase in the swirling motion of the exhaust gases (which positively affects the mixing of the reducing agent injected through the injection opening 7 with the exhaust gases).

According to a preferred embodiment shown in the accompanying figures, the base wall 10 of the mixing body 9 has an outer diameter which is greater than a diameter of the tubular side wall 12 in the area where it is joined to the base wall 10; as a consequence, the outlet opening 14 of the base wall 10 of the mixing body 9 also has a diameter which is smaller than the outer diameter of the base wall 10 and, hence, than a diameter of the outlet opening 6 of the tubular duct 2.

According to a preferred, though non-limiting embodiment shown in the accompanying figures, the inlet opening 13 of the tubular side wall 12 of the mixing body 9 is symmetrically arranged between the base wall 10 and the base wall 11 of the mixing body 9; namely, the inlet opening 13 is at the same distance from the base wall 10 and from the base wall 11 of the mixing body 9.

According to a preferred, though non-limiting embodiment shown in the accompanying figures, the inlet opening 13 of the tubular side wall 12 of the mixing body 9 develops for at least 120° (preferably 180°) around the central longitudinal axis 3 of the tubular side wall 12.

According to a preferred, though non-limiting embodiment shown in the accompanying figures, the inlet opening 13 of the tubular side wall 12 of the mixing body 9 develops along at least 70% (preferably at least 85%) of an axial size of the tubular side wall 12.

According to a preferred, though non-limiting embodiment shown in the accompanying drawings, the base wall 10 of the mixing body 9 has an annular edge 15, which is perpendicular to the base wall 10, develops for 360° around the central longitudinal axis 3, and rests against and is fixed (welded) to an inner surface of the tubular side wall 4 of the tubular duct 2.

Similarly, the base wall 11 of the mixing body 9 also has an annular edge 16, which is perpendicular to the base wall 11, develops for 150-210° (preferably 180°) around the central longitudinal axis 3, and rests against and is fixed (welded) to an inner surface of the tubular side wall 4.

According to a preferred, though non-limiting embodiment shown in the accompanying drawings, the base wall 11 of the mixing body 9 has a central portion 17 with a circular shape, which closes the tubular side wall 12 (namely, has the same diameter as the tubular side wall 12) and is separate and relatively far from the inner surface of the tubular side wall 4, and a side portion 18 with the shape of a circular sector, which has a greater diameter than the central portion 17, only partially surrounds the central portion 17, and extends up to the inner surface of the tubular side wall 4. The edge 16 is arranged only in the area of the side portion 18 of the base wall 11 of the mixing body 9. From another point of view, the base wall 11 of the mixing body 9 is obtained by joining a first semicircle having the same diameter as the tubular side wall 4 of the mixing body 9 and a second semicircle having the same diameter as the tubular side wall 4 of the tubular duct 2; hence, the first semicircle of the base wall 11 is smaller, is relatively far from the inner surface of the tubular side wall 4, and is not provided with the edge 16, whereas the second semicircle is greater, extents up to the inner surface of the tubular side wall 4, and has the edge 16.

FIGS. 5-8 show a different embodiment of the static mixing body 9, which is inserted inside the tubular duct 2 and creates a forced path to be followed by the exhaust gases in order to flow from the inlet opening 5 to the outlet opening 6.

The mixing body 9 shown in FIG. 5-8 has the perforated base wall 10 with a circular shape, which faces the outlet opening 6 of the tubular duct 2 and completely engages (closes) the cross section of the tubular duct 2 (namely, the exhaust gases cannot flow past the base wall 10, except through the outlet opening 14 of the base wall 10 itself), the base wall 11 with a partially circular shape, which faces the inlet opening 5 of the tubular duct 2 and only partially engages (closes) the cross section of the tubular duct 2 (namely, the exhaust gases can flow past the base wall 11 by flowing beside the base wall 11 itself), and the tubular side wall 12, which joins the base wall 10 to the base wall 11 and has the inlet opening 13, which leads into the mixing body 9.

In the mixing body 9 shown in FIGS. 5-8, the base wall 11 has a large plurality of small through holes 19 beside one another; in particular, there are different dozens of through holes 19 (approximately 80-100 through holes 19 in the embodiment shown in FIGS. 5-8). Each through hole 19 has a diameter ranging from 1 to 3 mm, which means that the diameter of each through hole 19 is equal to a small fraction of a diameter of the tubular duct 2; for example, the diameter of each through hole 19 is equal to 1-3% of the diameter of the tubular duct 2. According to a different embodiment which is not shown herein, the base wall 11 of the mixing body 9 shown in the FIGS. 5-8 is not provided with the through holes 19 (like the base wall 11 of the mixing body 9 shown in FIGS. 1-4). According to a preferred embodiment, the through holes 19 are arranged in the sole side portion 18 of the base wall 11 and, in particular, in an area opposite and far from the central portion 17 of the base wall 11 (namely, the central portion 17 of the base wall 11 is completely free from through holes).

It should be pointed out that the through holes 19 allow only a modest fraction of the exhaust gases coming from the inlet opening 5 of the tubular body 2 to flow through the base wall 11 of the mixing body 9 moving in an axial manner, whereas the main part of the exhaust gases coming from the inlet opening 5 of the tubular body 2 is forced to flow around the tubular side wall 12 of the mixing body 9 for approximately 180° in order to reach the area behind the inlet opening 13 (not engaged by the base wall 11 of the mixing body 9), which can be reached by the exhaust gases by axially moving from the inlet opening 5 of the tubular duct 2 to the inlet opening 13 of the mixing body 9.

In the embodiment shown in FIGS. 1-4, the tubular side wall 12 of the mixing body 9 has a conical shape, which is tapered from the base wall 10 to the base wall 11; on the other hand, in the embodiment shown in FIGS. 5-8, the tubular side wall 12 of the mixing body 9 has a cylindrical shape (namely, with a constant diameter).

In the embodiment shown in FIGS. 5-8, the base wall 11 has two panels 20, which prolong the edge 16 (namely, build a local extension of the edge 16 without gaps) at the two opposite ends of the side wall 12 and are arranged radially (perpendicularly) relative to the side wall 12. Namely, the mixing body 9 comprises the two panels 20, which are arranged radially (perpendicularly) relative to the side wall 12, are perpendicular to the base wall 11, and extend from opposite ends of the side wall 12 up to the tubular duct 2. Obviously, the two panels 20 have a smaller radial extension than the side wall 12 so as not to completely obstruct the path of the exhaust gases towards the inlet opening 13 of the mixing body 9. The function of the two panels 20 is that of making more winding the path of the exhaust gases that, from the inlet opening 5 of the tubular duct 2, have to reach the inlet opening 13 of the mixing body 9 in order to get to the outlet opening 6 of the tubular duct 2.

In the embodiment shown in FIGS. 5-8, the mixing body 9 consists of three distinct and separate pieces joined (welded) to one another: a first piece comprising the base wall 11, a second piece comprising the side wall 12, and a third piece comprising the base wall 10. Again, in the embodiment shown in FIGS. 5-8, the mixing body 9 is obtained by joining three initially distinct and separate pieces: a first piece comprising the base wall 11 and part of the side wall 12 having the inlet opening 13, a second piece comprising the remaining part of the side wall 12 without the inlet opening 13, and a third piece comprising the base wall 10; the first piece and the second piece making up the mixing body 9 interlock by means of the respective parts of the side wall 12, which are manufactured so as to be partially inserted into one another.

According to a different embodiment which is not shown herein, the tubular duct 2 could also house an oxidation catalytic converter arranged upstream of the mixing body 9 (namely, the first one to be flown through by the exhaust gases) and/or a SCR (Selective Catalytic Reduction) catalytic converter for the after-treatment of $NO_x$ (NO and $NO_2$) molecules and arranged downstream of the mixing body 9 (namely, the last one to be flown through by the exhaust gases); the SCR catalytic converter could also integrate a particular filter.

The embodiments described herein can be combined with one another, without for this reason going beyond the scope of protection of the invention.

The treatment device 1 described above has numerous advantages.

First of all, the treatment device 1 described above offers an ideal balance between the opposing needs of effectiveness (namely, of ensuring a proper mixing of the exhaust gases) and of efficiency (namely, of causing limited load losses in the exhaust gases). In other words, the treatment device 1 described above has, at the same time, a high effectiveness (namely, ensures a proper mixing of the exhaust gases) and a high efficiency (namely, causes limited load losses in the exhaust gases).

Furthermore, the treatment device 1 described above is particularly sturdy (hence, offers a long operating life and a very low risk of breaking), since it consists of a few parts.

The treatment device 1 described above has particularly small sizes (especially axial sizes) and a modest overall weight.

Finally, the treatment device 1 described above is simple and economic to be manufactured, since it consists of a few parts with a non-complicated shape and easy to be joined with standard annular welds.

LIST OF THE REFERENCE NUMBERS OF THE FIGURES 1 treatment device
2 tubular duct
3 central axis
4 tubular side wall
5 inlet opening
6 outlet opening
7 injection opening
8 tubular housing
9 mixing body
10 base wall
11 base wall
12 tubular side wall
13 inlet opening
14 outlet opening
15 annular edge
16 edge
17 central portion
18 side portion
19 through holes
20 panels

The invention claimed is:

1. An exhaust gas treatment device for an exhaust system of an internal combustion engine; the treatment device comprises:
   a tubular duct, which is delimited by a first tubular side wall and has a first exhaust gas inlet opening arranged in the area of a first base of the tubular duct, a first exhaust gas outlet opening opposite the first inlet opening and arranged in the area of a second base of the tubular duct, and an injection opening, which is obtained through the first tubular side wall between the first inlet opening and the first outlet opening and is designed to receive an injector for a reducing substance; and
   a mixing body, which is arranged inside the tubular duct, creates a forced path to be followed by the exhaust gases in order to flow from the first inlet opening to the first outlet opening, and is hollow on the inside so that the exhaust gases can flow through it;
   wherein the mixing body has a first perforated base wall with a circular shape, which faces the first outlet opening of the tubular duct and completely engages the cross section of the tubular duct, a second base wall with a partially circular shape, which faces the first inlet opening of the tubular duct and only partially engages the cross section of the tubular duct;
   wherein the mixing body has a second tubular side wall, which joins the first base wall to the second base wall and has a second inlet opening leading into the mixing body and wherein the second inlet opening develops for at least 120° around a central longitudinal axis of the second tubular side wall.

2. A treatment device according claim 1, wherein the second tubular side wall has a conical shape, which is tapered from the first base wall to the second base wall.

3. The treatment device according to claim 1, wherein the second tubular side wall has a cylindrical shape with a constant diameter.

4. The treatment device according to claim 1, wherein the second base wall has a plurality of through holes beside one another.

5. The treatment device according to claim 1, wherein the second inlet opening is arranged on the opposite side relative to the injection opening so that the injection opening faces a portion of the second tubular side wall without holes.

6. The treatment device according to claim 1, wherein the first base wall has, at the center, one single second exhaust gas outlet opening with a circular shape.

7. The treatment device according to claim 1, wherein the first base wall has a first annular edge, which is perpendicular to the first base wall, develops for 360° around a central longitudinal axis, and rests against an inner surface of the first tubular side wall.

8. The treatment device according to claim 1, wherein the second base wall has a second edge, which is perpendicular to the second base wall, develops for 150-210° around a central longitudinal axis, and rests against an inner surface of the first tubular side wall.

9. The treatment device according to claim 1, wherein the second base wall has a central portion with a circular shape, which closes the second tubular side wall, and a side portion with the shape of a circular sector, which has a greater diameter than the central portion and only partially surrounds the central portion.

10. The treatment device according to claim 9, wherein the side portion of the second base wall has a second edge, which is perpendicular to the second base wall, develops for 180° around a central longitudinal axis, and rests against an inner surface of the first tubular side wall.

11. The treatment device according to claim 9, wherein the side portion of the second base wall has a plurality of through holes beside one another and the central portion of the second base wall is completely without through holes.

12. The treatment device according to claim 1, wherein the second base wall is obtained by joining a first semicircle having the same diameter as the second tubular side wall of the mixing body and a second semicircle having the same diameter as the first tubular side wall of the tubular duct and, hence, greater than the first semicircle.

13. The treatment device according to claim 1, wherein the first base wall has an outer diameter which is greater than a diameter of the second tubular side wall in the area where it is joined to the first base wall.

14. The treatment device according to claim 1, wherein the second base wall partially engages the cross section of the tubular duct in the area of the second inlet opening.

15. The treatment device according to claim 1, wherein the mixing body comprises the two panels, which are arranged radially relative to the side wall, extend from opposite ends of the side wall up to the tubular duct, and have a smaller axial extension than the side wall.

16. The treatment device according to claim 15, wherein the two panels extend starting from the second base wall and are perpendicular to the second base wall.

\* \* \* \* \*